INVENTOR.
ERNEST C. PELLATON

June 2, 1970  E. C. PELLATON  3,515,037
APPARATUS AND METHOD FOR FORMING TAPED ARTICLES
Filed April 1, 1968  7 Sheets-Sheet 3
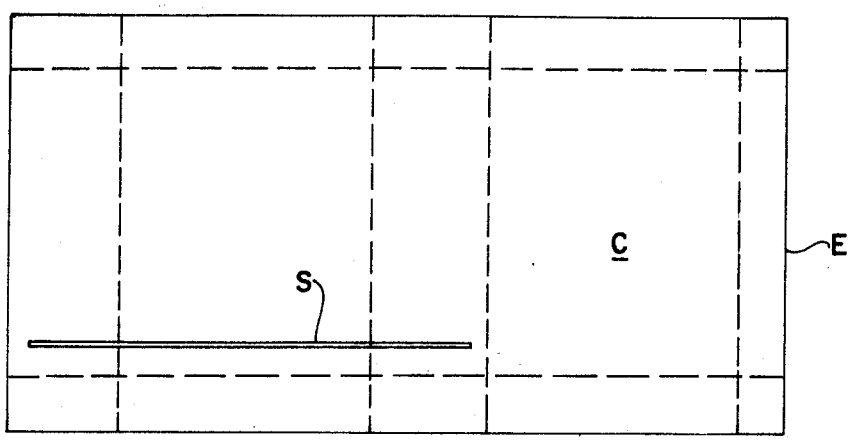
FIG. 3.
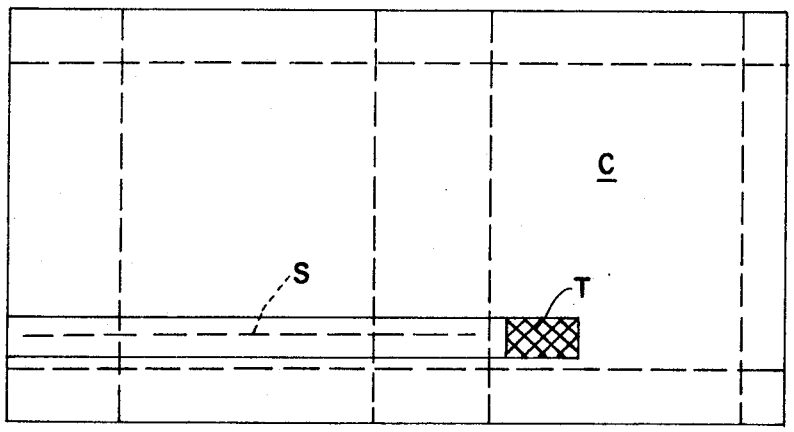
FIG. 4.
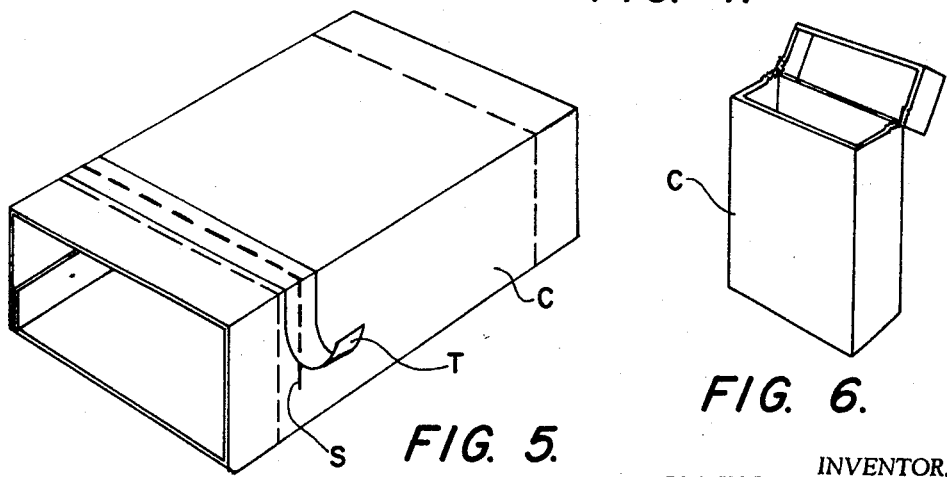
FIG. 5.
FIG. 6.
INVENTOR.
ERNEST C. PELLATON
BY Fryer, Tjensvold
Feix, Phillips & Lempio
ATTORNEYS

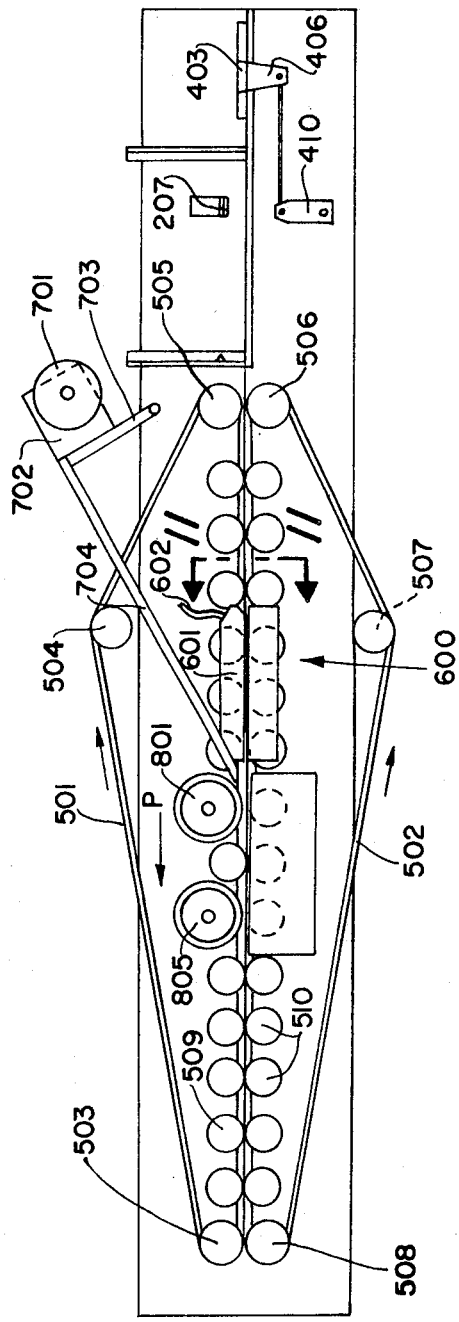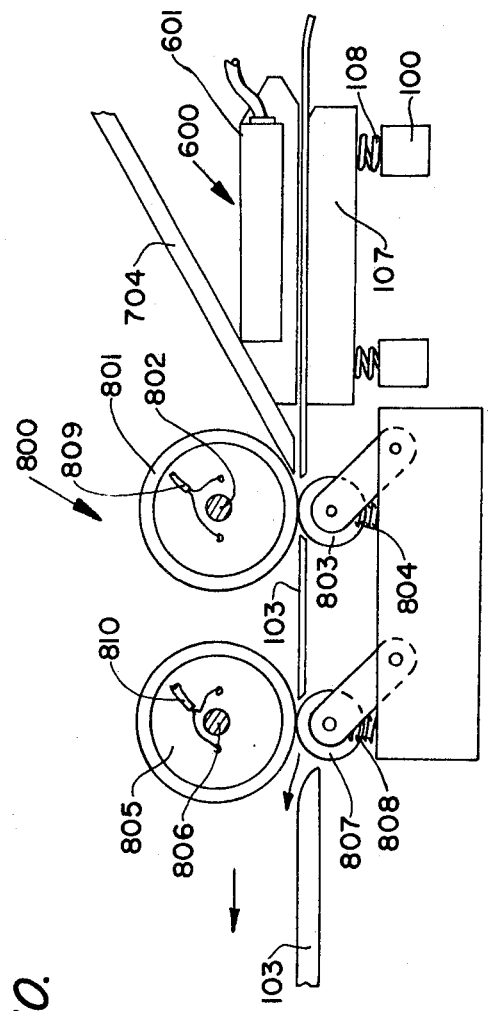

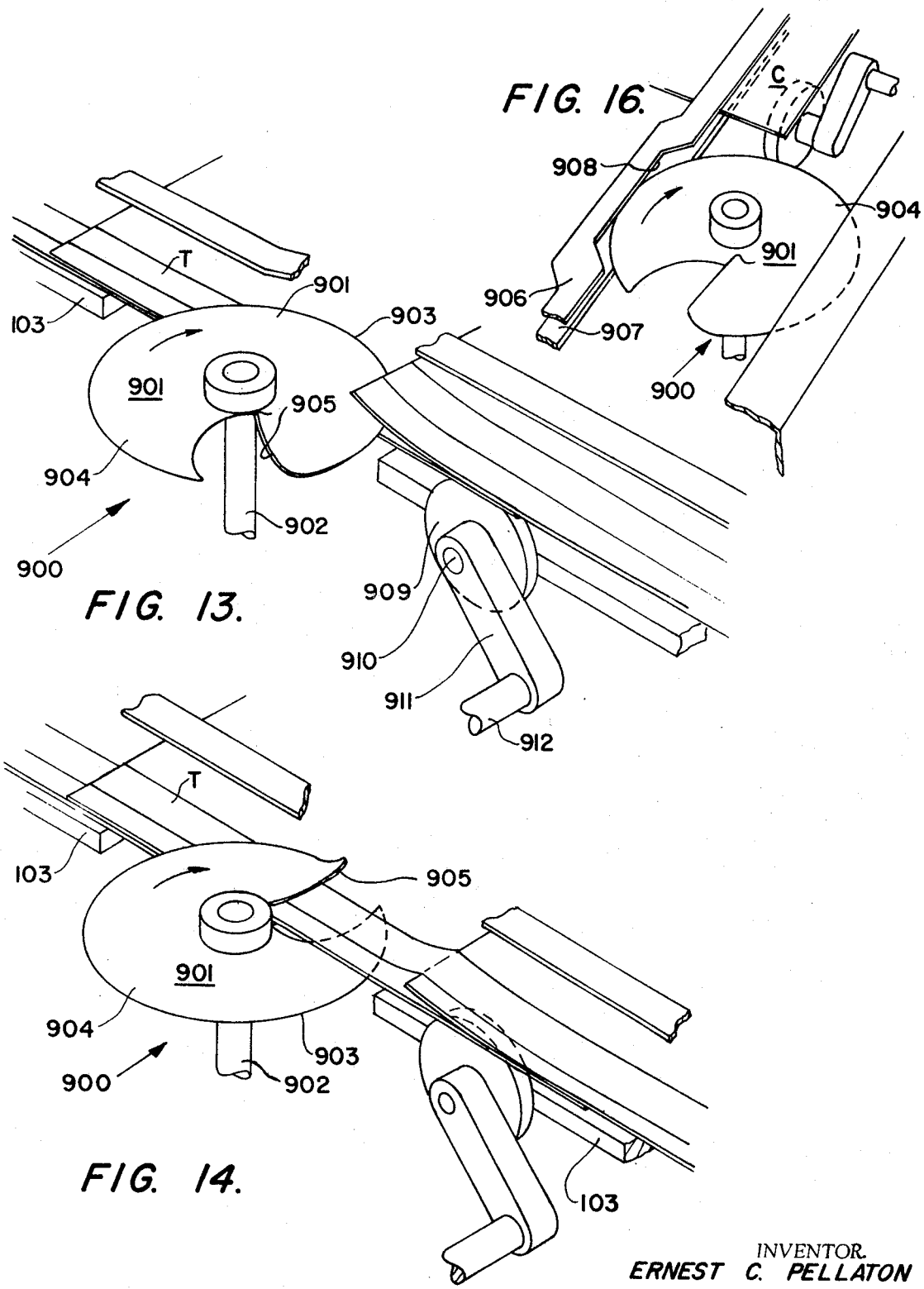

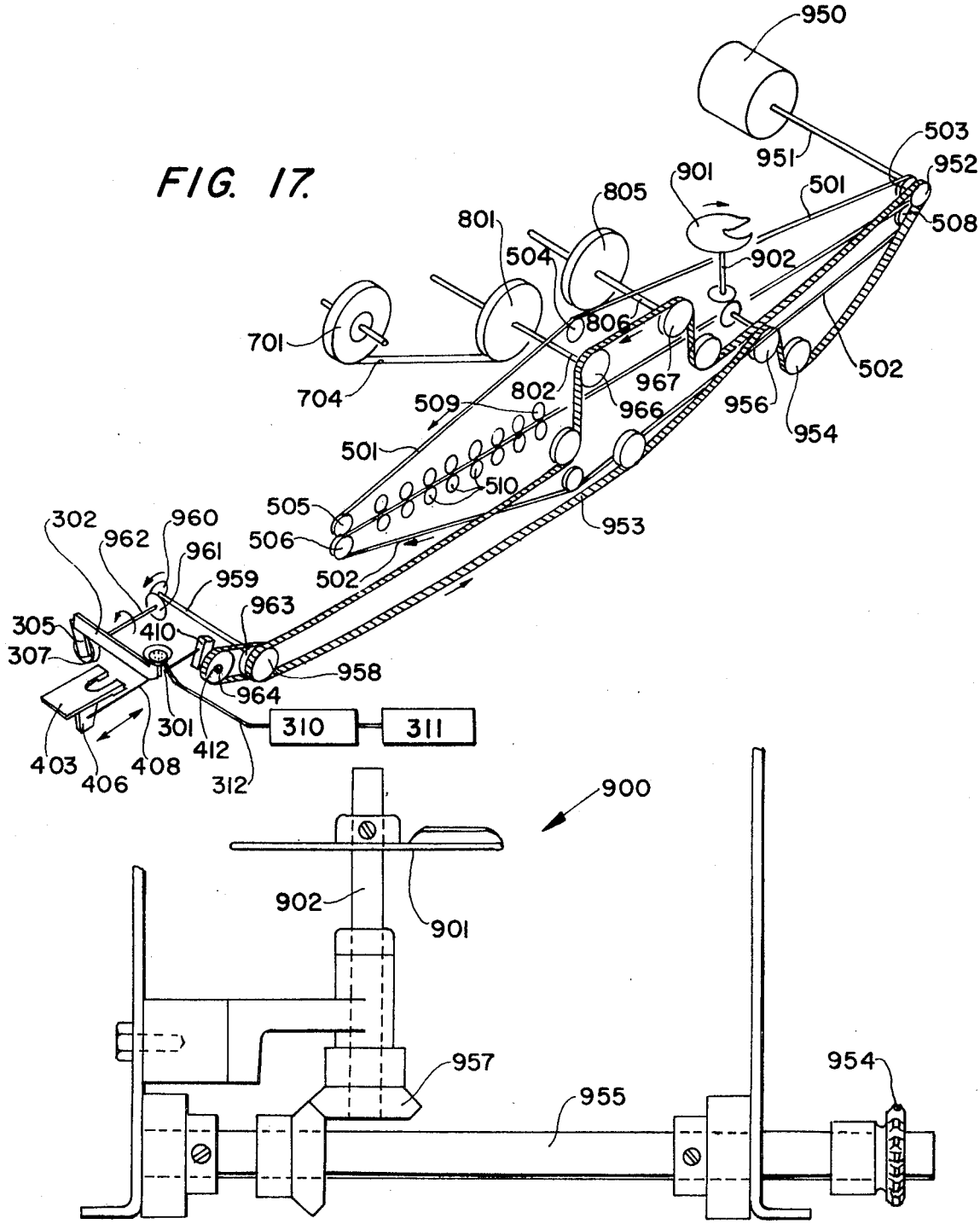

United States Patent Office 3,515,037
Patented June 2, 1970

3,515,037
APPARATUS AND METHOD FOR FORMING TAPED ARTICLES
Ernest C. Pellaton, Larkspur, Calif., assignor to Fibreboard Corporation, San Francisco, Calif., a corporation of Delaware
Filed Apr. 1, 1968, Ser. No. 717,810
Int. Cl. B31d 5/00; B26d 5/20
U.S. Cl. 93—1                                        27 Claims

ABSTRACT OF THE DISCLOSURE

An apparatus for forming taped carton blanks comprises a magazine having a plurality of flattened blanks retained therein and a suction cup mounted below the magazine to cooperate with a shuttle mechanism to position the blanks in overlapping relationship. A continuous tape is applied to the overlapped carton blanks and a rotary cutter thereafter cuts the tape to separate the blanks.

BACKGROUND OF THE INVENTION

Increased popularity of "easy open" frozen food cartons and the like dictates the need for apparatus and methods for expeditiously and efficiently forming such cartons. One such carton utilizes a removable tear strip or tape secured to the erected carton to facilitate opening thereof. Conventional apparatus and methods normally contemplate applying an individual tear strip to each carton blank or erected carton whereby production time is greatly increased over packaging operations wherein no tear strip is utilized. In addition, problems may be encountered when attempts are made to precisely position and adhere the tape over cut lines formed on the carton to form a positive seal thereat.

An object of this invention is to overcome the above, briefly described problems by providing an apparatus and method whereby a continuous tape is applied to flat articles, such as carton blanks, when they are maintained in overlapped or shingled relationship with respect to each other. Such application facilitates expeditious and efficient carton formation in that alignment, sealing and related problems are substantially eliminated.

Another object of this invention is to provide a method and means for expeditiously and economically applying a heat sensitive tape to a carton blank by preheating surface portions of the blank whereat the tape is applied.

A further object of this invention is to provide a method and means for expeditiously and precisely separating two connected and overlapped flat articles by rotating a cutting disc therebetween.

Further and more specific objects of this invention will become apparent from the following description and drawings wherein:

FIG. 1 is an isometric view illustrating an apparatus embodying this invention;

FIG. 2 schematically illustrates a series of method steps which may be performed with the FIG. 1 apparatus;

FIGS. 3–6 illustrate a paperboard carton blank in various stages of formation into an erected carton;

FIG. 10 is a cross-sectional view taken in the direction of arrows 10—10 in FIG. 1 with parts removed for clarification purposes;

FIG. 12 is an enlarged, side elevational view of a heat sealer assembly employed in the FIG. 1 apparatus;

FIGS. 13 and 14 are enlarged isometric views illustrating the operation of a blank separating means employed in the FIG. 1 apparatus;

Figure 1:
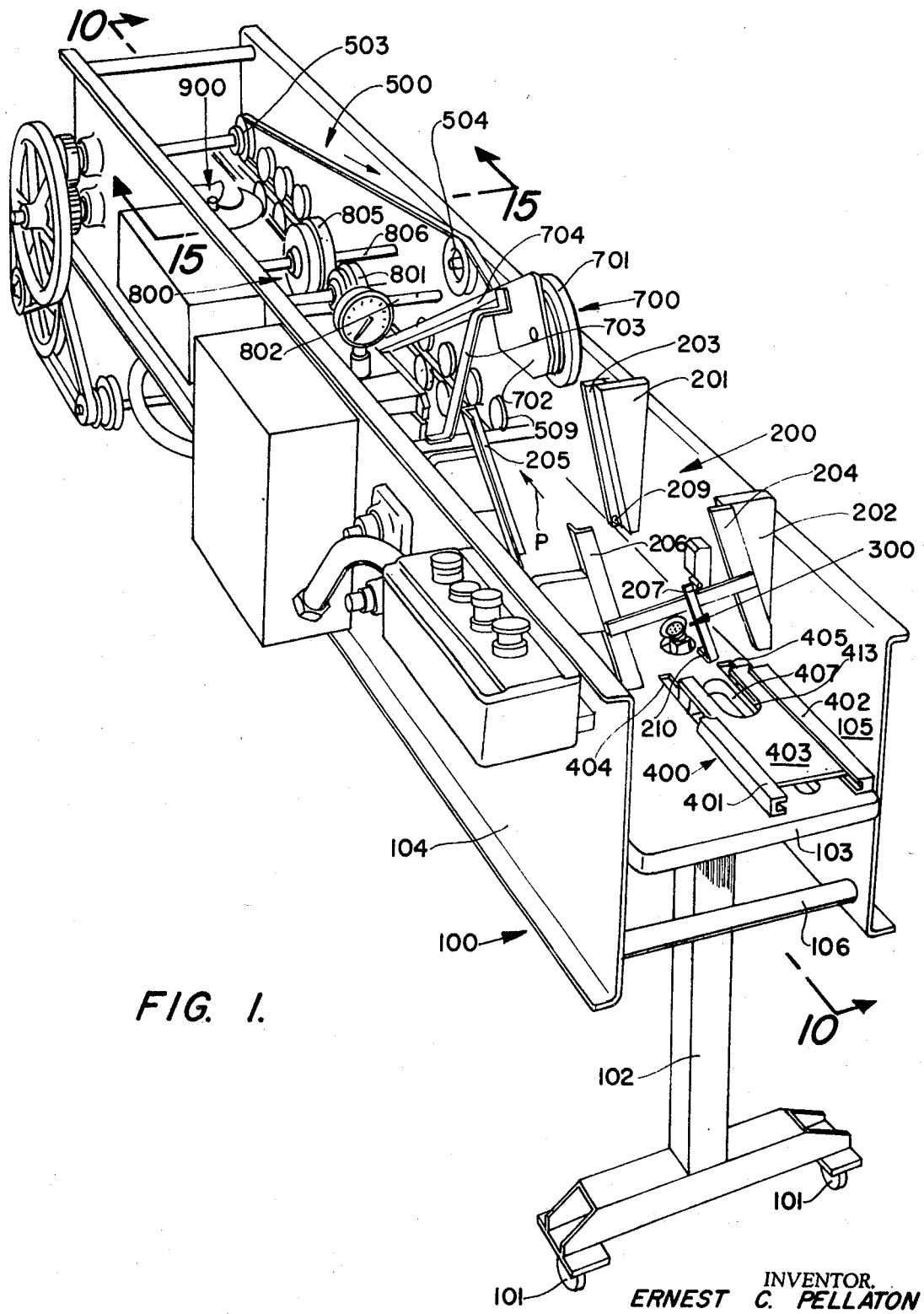
Figure 2:
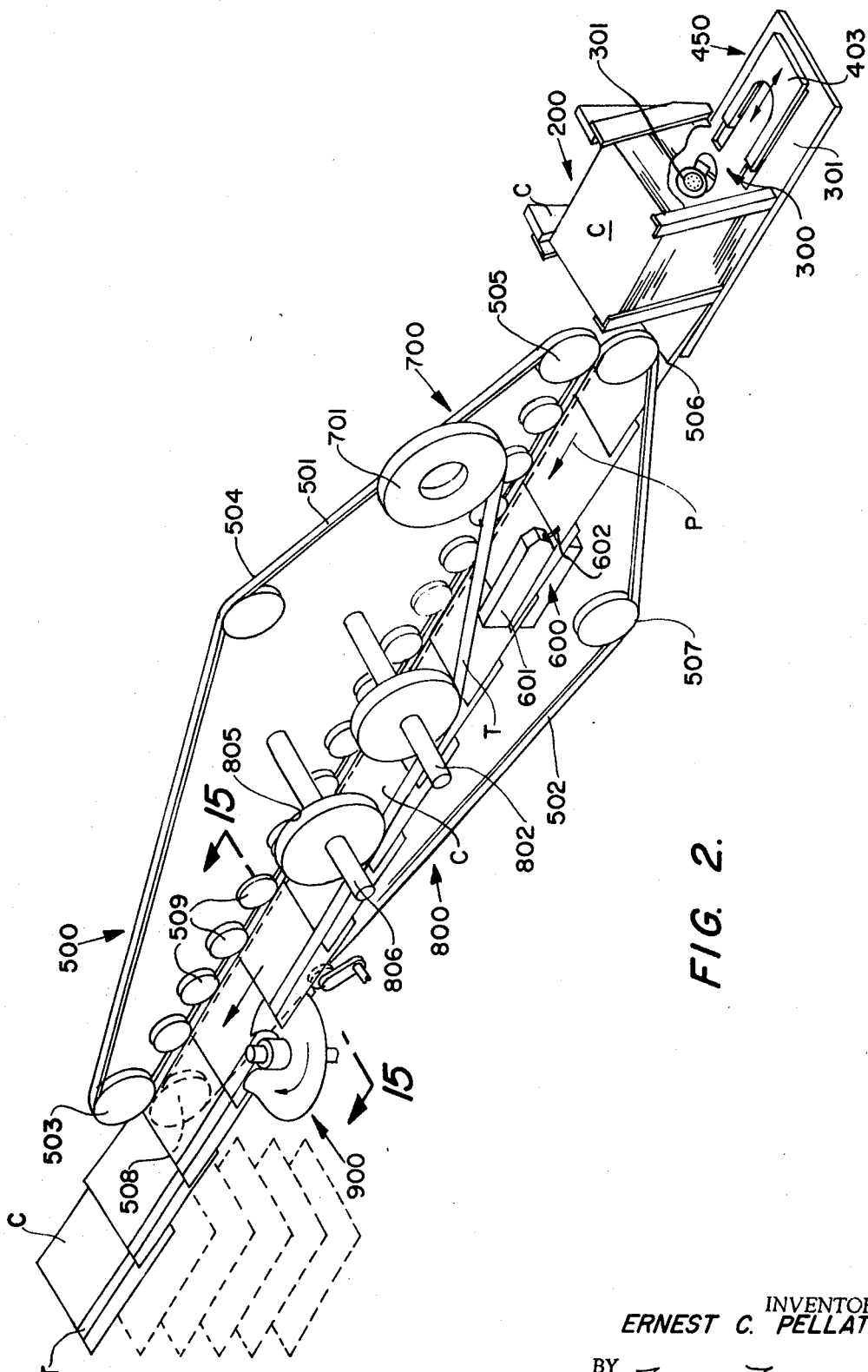

FIG. 15 is an enlarged sectional view taken in the direction of arrows 15—15 in FIGS. 1 and 2, illustrating the FIGS. 13 and 14 blank separating means in front elevation;

FIG. 16 is an isometric view, similar to FIGS. 13 and 14, illustrating a blank hold-down bar for use with the separating means;

FIG. 17 schematically illustrates the integrated drive train and control systems employed with the FIG. 1 apparatus.

GENERAL DESCRIPTION OF PREFERRED APPARATUS EMBODIMENT

The preferred apparatus embodiment of FIG. 1 generally comprises a stationary frame 100 having a magazine 200 mounted thereon for retaining a plurality of flattened carton blanks therein. Feeding means comprising a pivotally mounted suction cup means 300 and shuttle mechanism 400 removes the blanks from the carton magazine and positions them in overlapping or shingled relationship (FIG. 2). Conveying means 500 comprises opposed endless belts for positively engaging opposite sides of the carton blanks to move them along a planar path P.

A preheating means 600 (FIG. 2) heats upper surface areas of the blanks prior to transfer of a continuous tape thereto by taping means 700. Positioning and securing means 800 functions to bond the tape to the cartons. A horizontally disclosed cutting means 900 is rotatably mounted adjacent to the discharge end of the apparatus to sever the tape and separate the blanks from each other. The separated blanks are then suitably removed from the machine and transported to a packaging facility for subsequent erection, filling and closing.

DESCRIPTION OF CARTON BLANK

FIGS. 3–6 illustrate a carton blank C which may have a removable tear strip or tape T applied thereto pursuant to teachings of this invention. The blank may be suitably cut and scored to have a slit S formed therethrough, adapted to have tape T bonded thereover. As illustrated in FIG. 6, upon removal of the tape from an erected carton the top closure may be opened to expose the contents thereof for consumption purposes.

The surface portions of the blank denoted by crosshatching in FIG. 4 is preferably coated with an abhesive to prevent the end portion of the tape from bonding thereto. Thus, the tape's end portion may be easily grasped by a consumer for tape removal purposes. In addition, slit S preferably terminates short of the larger side panels (FIG. 3) to facilitate tape application and to prevent complete opening of the carton's top closure when the tape is removed (FIG. 6).

DETAILED DESCRIPTION OF PREFERRED APPARATUS EMBODIMENT

Frame 100 may be suitably mounted on a plurality of rollers 101, two of which are shown in FIG. 1, to facilitate positioning of the apparatus at a desired location. Two or more T-shaped support members 102 may be vertically disposed in the manner shown and secured to a platen or base plate 103 supporting components of the apparatus. Vertically disposed and spaced side plates 104 and 105 may be secured to platen 103 by conventional means. Suitably arranged cross braces 106, one of which is shown in FIG. 1, may be secured between the plates to afford further structural integrity to the integrated apparatus.

Carton magazine 200 (FIGS. 1 and 7-9) comprises triangularly shaped and spaced guide members 201 and 202 secured to side plate 105. End plates 203 and 204 are secured to the respective members to form L-shaped channels or notches therewith to retain and guide two edges of the rectangular carton blanks during movement thereof. Angle bars 205 and 206, secured to side plate 104, are arranged to form channels therein for retaining and guiding the other two corners of the carton blanks.

The four channels are preferably positioned in substantially parallel relationship with respect to each other and positioned to maintain the carton blanks at an acute angle (FIG. 7) with respect to the top working surface of platen 103. The angle is preferably selected from a range of from 10° to 60° to maintain the carton blanks at such an angle with respect to the platen and a horizontally disposed plane containing path P. In an actual application, the angle closely approximated 20°. It can be seen that the feeding speed for the blanks is substantially increased over conventional speeds primarily since the carton blanks move a relatively short distance for their placement onto the platen.

Figure 7:
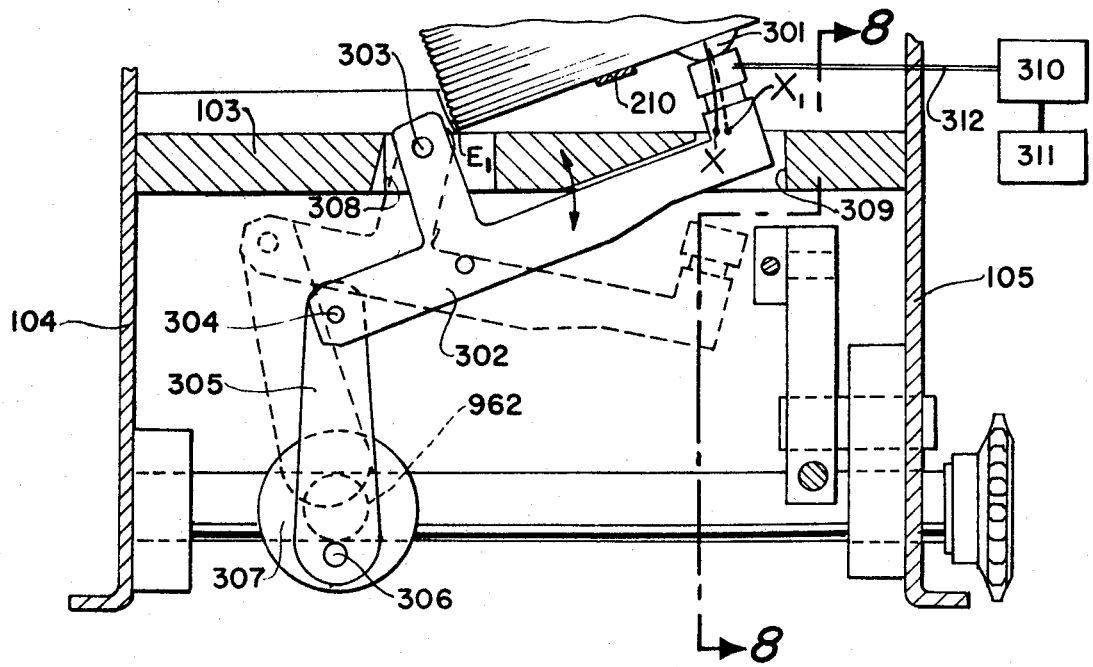
FIG. 7 is a sectional view through the apparatus illustrating a suction cup arrangement employed therein.
Figure 8:
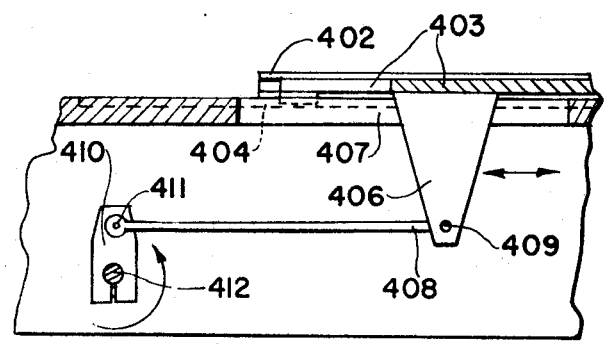
FIG. 8 is a reduced sectional view taken in the direction of arrows 8—8 in FIG. 7.
Figure 9:
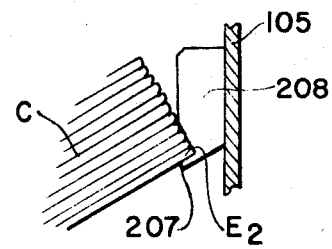
FIG. 9 is an enlarged view of a detent used in the apparatus to support a stack of carton blanks therein.

As further illustrated in FIG. 7, an edge $E_1$ of the lowermost carton blank is preferably maintained on platen 103 whereas an opposite edge $E_2$ is held in its proper position by a detent or lug 207 (FIG. 9). The detent may be secured to side plate 105 via a support bar 208 positioned between guide members 201 and 202. Detents 209 and 210 (FIG. 1) may be utilized if so desired to further aid in releasably holding the stacked carton blanks.

As will be hereinafter more fully described, a suction cup means or assembly 300 (FIGS. 1 and 7) functions to grasp and flex the lowermost carton blank to release it from the detents and to properly position the carton blank on platen 103. The suction cup assembly, normally positioned below path P, comprises a conventional suction cup 301 secured to a bellcrank 302, pivotally mounted to platen 103 by pivot pin 303. The bellcrank is further connected by a pivot pin 304 to a lever or crank 305. The lever is connected by a pivot pin 306 to form an eccentric drive connection with a disc 307, rotatably mounted in the apparatus.

Thus, rotation of disc 307 will function to pivot bellcrank 302 between the solid and dotted line positions illustrated in FIG. 7 to engage suction cup 301 with the lowermost carton blank to move it out of the carton magazine. It should be noted that pivot pin 303 is preferably positioned vertically below the top surface of platen 103 and also a plane containing the lowermost carton blank. Thus the blank will move rightwardly and horizontally a slight amount when the suction cup moves to point $X_1$ on the platen whereas the cup would move to point X if the pivot pin was coincident with the top surface of the platen. Such placement of the pivot pin will assure removal of the blank's edge $E_1$ from beneath the weighty blanks stacked thereabove.

Apertures 308 and 309 are suitably formed through platen 103 to provide proper clearances for movements of the bellcrank and suction cup. Conventional control means 310 are utilized to intermittently communicate a vacuum source 311 with the vacuum cup via flexible line 312 in timed relationship with respect to other operating components of the apparatus. The preferred integrated drive train for the apparatus will be hereinafter described with reference to FIG. 17.

Shuttle means or mechanism 400 (FIGS. 1, 7 and 8) comprises spaced guide plates 401 and 402 secured to platen 103 to form a guide means for a reciprocal plate 403. Guide tracks 404 and 405 may be formed on platen 103 to cooperate with lugs formed on the underside of plate 403 to further aid in controlling reciprocation of the plate. The plate has an extension 406 secured thereto and arranged to project downwardly through an elongated slot 407 formed in platen 103. The other end of the extension is mounted to one end of a connecting rod 408 by a pivot pin 409.

The connecting rod is further connected to a lever or crank 410 by a pivot pin 411. The crank is secured to a shaft 412 to rotate therewith to in turn reciprocate the connecting rod. Then rod 408 will thus function to reciprocate plate 403 to engage and move a carton blank in a leftwardly direction along path P in FIG. 8 after the suction cup assembly has positioned the blank on platen 103. A slot 413 is formed in plate 403 to prevent contact between the adjacent suction cup and plate during the timed sequence of movements occurring therebetween.

Figure 11:
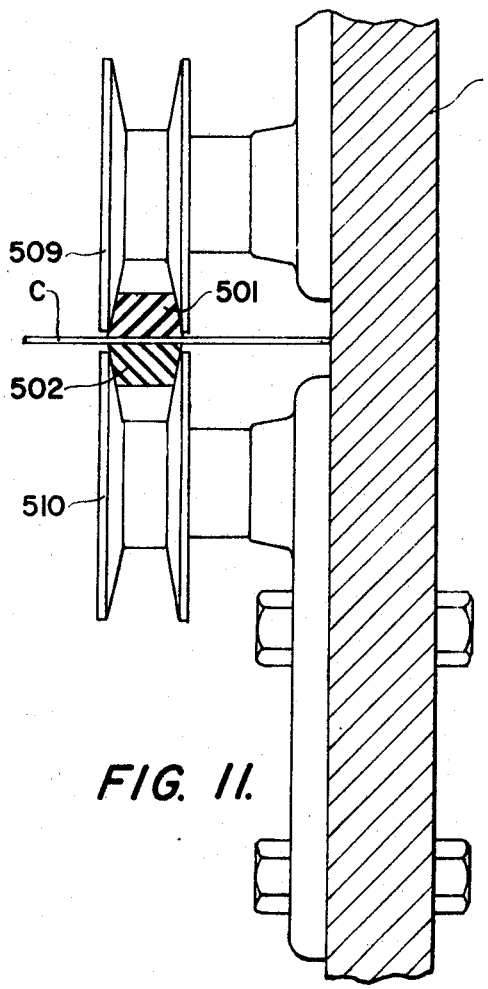
FIG. 11 is an enlarged sectional view taken in the direction of arrows 11—11 in FIG. 10.

Conveying means 500 (FIGS. 1, 2, 10 and 11) comprises opposed endless belts 501 and 502 suitably mounted on a plurality of pulleys 503-508 to engage opposite sides of the blanks to move them along path P. In the preferred embodiment, pulley 503 constitutes the drive pulley whereas the remaining pulleys may constitute idlers. A plurality of aligned rollers or smaller idler pulleys 509 and 510 are positioned to compress the belts together to positively grip and retain the carton blanks therebetween (FIG. 11). All the above discussed pulleys are mounted for rotation on frame 100 of the apparatus by suitable bearing and shaft arrangements.

In the preferred apparatus embodiment, lower pulleys 510 are held stationary on the frame whereas upper pulleys 509 are spring-loaded (not shown). Such spring-loading allows the top holding belt 501 to flex slightly in a vertical direction to compensate for uneven thicknesses of the carton stream. Such uneven thicknesses are primarily caused by the overlapping relationship of the shingled cartons. The drive means for pulley 503 will be hereinafter more fully described.

Preheating means 600 (FIGS. 2, 10 and 12) functions to raise the temperature of upper surface portions or areas of the carton blanks whereat the tape is applied. Such temperature approximates the bonding temperature for the tape, e.g. 200° F. for polyethylene. The preheating means may comprise a metallic heating bar 601 having electrical leads 602 suitably connected thereto for heating the resistance coils (not shown) contained in the bar to the desired temperature. In the preferred embodiment, air is circulated over and heated by the coils and discharged onto the blank by a series of orifices (not shown) suitably formed on the underside of the bar. The heated air streams function to heat the blank as well as "cushion" same to prevent marking of a polyethylene coating, for example, formed thereon.

A support bar 107 is suitably mounted on portions of frame 100 to underlie bar 601 to provide backup support for the carton blanks. In the preferred embodiment, bar 107 has passages (not shown) suitably formed therein to circulate water or other suitable cooling fluid therethrough. Thus the bar will further function as a heat sink during the application of heat to the carton blanks. The support bar is positioned to have the top surface thereof substantially coincide horizontally with the top surface of platen 103. Springs 108 may be utilized to support bar 107 to further compensate for the above-mentioned uneven thicknesses of the carton stream and to prevent "jamming."

When the tape is applied to cartons not having a plastic coating formed thereon, the temperature of the air stream emitted from bar 601 would normally be maintained considerably higher than normal sealing temperatures involving the taping of plastic (e.g. polyethylene) coated blanks. Alternatively, such heating of the blanks may be accomplished by radiation, ultra high-frequency currents, microwaves, modified laser means or a combination of the above media.

Taping means 700 (FIGS. 1, 2, 10 and 12) comprises a removable spool of tape 701 suitably mounted above path P for rotation on a bracket 702 secured to a brace 703. The tape is preferably heat sensitive and may be coated with polyethylene or other suitable material which will readily bond to the carton blanks. The brace is in turn secured by suitable means to frame 100 of the apparatus. A bar 704 forms a guide means or track therein positioned adjacent to the spool to guide the tape downwardly towards the cartons. The track is preferably disposed at an angle of from 15° to 60° with respect to horizontally disposed platen 103 and path P to feed the tape tangentially onto the carton blanks.

A tape cutter (not shown) is preferably mounted on bar 704 to cut the tape when all carton blanks have been fed out of the carton magazine. Suitable sensing means can be employed to perform such a cutting operation automatically. Such sensing means may be operatively associated with solenoid suitably arranged to actuate the tape cutter or blade.

Positioning and final sealing means 800 (FIGS. 1, 2, 10 and 12) comprises a first positioning roll 801 secured to a shaft 802, adjacent to the lower terminal portion of bar 704. The periphery of the roll is preferably positioned tangentially relative to the bar and also to the horizontally disposed plane containing platen 103. Shaft 802 is suitably mounted in frame 100 of the apparatus. Peripheral portions of the roll engage the top surface of the tape to position and compress it onto the carton blanks. A roller 803 is rotatably mounted vertically below roll 801 to form backup means for the latter during application of the tape.

Spring means, schematically illustrated at 804, may be arranged to permit roll 803 to move vertically a limited amount to compensate for uneven thicknesses of the carton stream. The cartons continue to move leftwardly in FIG. 12 to move under a heating and final compression roll 805. The roll is secured to a shaft 806 which is in turn rotatably mounted on frame 100 of the apparatus. A roller 807, similar to roller 803, may be spring-biased by spring means 808 to aid in fully compressing the tape and carton blanks together for sealing purposes. Electrical leads 809 and 810 may be employed to connect an electrical power source to conventional resistance heaters contained in rolls 801 and 805 to provide heating means for further heating the tape during the sealing function.

Cutting means 900 (FIGS. 1, 2 and 13–16) thereafter severs the tape to separate the blanks from each other. The cutting means comprises a disc 901 secured to a shaft 902 suitably mounted on frame 100 to rotate the disc in a plane substantially coinciding with a horizontally disposed plane containing the carton blanks. The disc comprises a cutting edge 903, flat surface portions 904 and a raised portion 905. After cutting edge 903 has severed the tape to separate leading and trailing blanks from each other (FIG. 13), raised portion 905 will move over the trailing blank to hold it under disc 901 (FIG. 14) to ready the disc for the next cutting operation.

As clearly illustrated in FIG. 16, spaced guide plates 906 and 907 cooperate with belts 501 and 502 to support and maintain the carton blanks in their proper position therebetween during movement through the cutting means. Plate 906 has a cut-out 908 which permits disc 901 to function without interference therefrom. The finished carton blanks may then be deposited in a suitable retaining means positioned at the end of the apparatus, as illustrated in FIG. 2. A roller 909 may be pivotally mounted on a pin 910 of a link 911 secured to a shaft 912, mounted for limited oscillation on frame 100. A spring means (not shown) may be constructed and arranged to pivot the shaft and link clockwise to slightly raise a corner of the trailing blank (FIG. 14) to facilitate entry of cutting edge 903 between the blanks.

From the above description it can be seen that numerous advantages accrue from the use of such a cutting means or its equivalent. For example, any slight discrepancy in carton placement along path P (FIG. 2) will only effect the length of the pull tab formed by tape T. Such a length can vary within prescribed limits without any detrimental effect on the carton's function or appearance. Also, such cutting does not accumulate errors due to possible misalignment of a particular carton blank, for example.

In particular, when leading and trailing carton blanks are separated from each other, previous "placement errors" are eliminated. It should be further noted that cutting edge 903 is formed on a substantially large portion of the disc's perimeter to provide a wide tolerance for assuring precise carton blank severance. In addition, passage of the disc between adjacent blanks insures against the possibility that two blanks may be bonded or heat sealed together inadvertently. It should be further noted that two or more raised portions 905 could be suitably formed and spaced about the periphery of disc 901 to duplicate the above described cutting function.

DESCRIPTION OF PREFERRED DRIVE TRAIN

FIG. 17 schematically illustrates a preferred drive train for the FIG. 1 apparatus. A main, electrical drive motor 950 may be suitably controlled to vary the speed of an output shaft 951 thereof. The shaft has drive pulley 503 suitably splined or otherwise secured thereto to drive endless belt 501 of the conveying means. In the preferred embodiment, only belt 501 is driven although an additional power take-off from shaft 951 could be employed to directly drive roller 508 and thus belt 502 if so desired.

Shaft 951 has a sprocket 952 secured to the outer end thereof to drive an endless chain 953. The chain is suitably mounted on a plurality of idler and drive sprockets, including a sprocket 954 secured to a shaft. The shaft in turn drives a pair of bevel gears to rotate vertically disposed shaft 902. As described above, shaft 902 rotates cutting disc 901 for carton blank separation purposes.

Drive chain 953 is further arranged to drive a sprocket 958 secured to a shaft 959. Shaft 959 in turn drives bevel gears 960 and 961 which in turn impart rotation to a shaft 962. Shaft 962 functions to rotate disc 307 of the drive means employed for reciprocating bellcrank 302 and vacuum cup 301. A sprocket 963 is also secured to shaft 959 to drive a sprocket 964 via an endless chain. Sprocket 964 in turn drives shaft 412 to reciprocate plate 403 of the shuttle mechanism in the manner above described.

Main drive chain 953 is further constructed and arranged to drive sprockets 966 and 967. The latter sprockets are secured to shafts 802 and 806, respectively, to drive wheels 801 and 805 at the tape positioning and sealing station. It should be further understood that master control means (not shown) are operatively associated with main drive motor 950 and vacuum control means 310 to permit the suction cup to intermittently draw a vacuum therein in timed relationship with the operation of the other components of the apparatus. The various drive ratios and the like employed in the apparatus may be suitably achieved by one skilled in the art and, therefore, further explanation thereon will not be made.

PREFERRED METHOD EMBODIMENT

The preferred method embodiment may be best understood by reference to FIG. 2. Carton magazine 200 is arranged for maintaining flattened carton blanks C in stacked relationship therein, above suction cup 301 and path P. The above described suction cup 301 is arranged for grasping and pulling the lowermost carton to release it from the various detent means retaining it in the carton magazine. The blank will flex and bow slightly to permit the blank to be quickly released from the next trailing blank.

The suction cup continues to move towards its FIG. 7, dotted line position and releases its vacuum hold on the blank when the blank is moved onto platen 103. As described above, the relatively short vertical distance the blank must move is conducive to high speed feeding operations. In addition, the suction cup moves horizontally and rightwardly a slight amount to point $X_1$ in FIG. 7 to positively remove the lowermost blank from the weighty stack of blanks.

Substantially simultaneously with such positioning, plate 403 of shuttle mechanism 400 performs the step of engaging the trailing end of the carton blank to move it leftwardly and horizontally (FIG. 2). Subsequent feeding steps will function to place the carton blanks in partial overlapping or shingled relationship with respect to each other to expose a leading edge and cover a trailing edge thereof. The length of blank overlap largely determines the finished length of tape which is applied to the blanks. The linear speed of plate or pusher 403 is preferably slightly faster than the linear speed of belts 501 and 502 of conveying means 500.

Such speed difference assures exact placement of each succeeding blank to maintain accurate spacing of the leading edges thereof. Belts 501 and 502 are arranged for positively gripping opposite surfaces of the carton blanks at a position remote from tape T to exactly position and convey them during subsequent method steps. As described above, spring loading of upper pulleys 509 provides means for compensating for uneven thicknesses of the carton stream occasioned by the overlapping nature thereof.

Preheating means 600 is positioned above the blanks for raising the surface temperature of top surface portions thereof, whereat the tape is to be applied, to the approximate sealing temperature. Reel 701 is positioned above the blanks to cooperate with bar 704 and roll 801 for feeding the tape downwardly and tangentially onto the blanks. Roller 801 further functions for precisely positioning and securing or bonding the tape onto the previously heated surface portions of the carton blanks.

Such a tape application or bonding step preferably occurs immediately following the preheating step so that the heat will not unduly dissipate prior to such application. When lightweight tape is applied to relatively heavy paperboard, heat is absorbed by the tape substantially instantaneously. Thus, the tape's polyethylene or other suitable coating will effect an immediate bond between the blank and tape. Thereafter, the tape remains firmly adhered to the carton blanks with no tendency to shift or slide out of position.

Preheater 600 eliminates the need for conducting the sealing heat through the tape and to the paperboard, as is done in conventional hot roll sealing systems. It can be further seen that no special tape holding and aligning equipment is required after the initial placement of the tape on the blanks. Also, the "free-wheeling" tape feed need not be synchronized with respect to the linear speed of the blanks along path P. In addition, roll 801 may be heated to prevent undue chilling of the tape and dissipation of heat accumulated at the carton surface.

When very light or thin tapes are utilized, adequate tape bonding may be accomplished by only using roller 801. The temperature of roll 801 may be varied by suitable control means (not shown) to accommodate sealing of various tape and blank compositions. Final sealing roll 805 may be employed for heating the tape to a temperature assuring complete bonding. Such temperature may also be varied in accordance with the particular materials used and the conveying speeds desired.

At this point, the stream of carton blanks is now sealed into a continuous web by the unbroken length of sealed tape. The cutting means is then arranged for severing the tape at the leading edge of a leading blank to separate a trailing blank therefrom. Cutting wheel 901 is somewhat similar in its working principle to a coarse screw thread having a sharpened cutting edge around the greater portion of its perimeter. In particular, during rotation of disc 401 raised portion or lip 905 thereof permits the disc to climb over each trailing carton blank. The cutting edge then passes between the shingled cartons to sever the tape exactly at the point desired.

Such a cutting step may be precisely accomplished within a wide range of tolerances primarily due to the large length of cutting edge 903. An alternative method step could be utilized in certain applications for cutting the tape. For example, an electrically heated wire could be suitably positioned to cut the tape and separate the blanks.

I claim:
1. An apparatus for forming taped articles comprising a magazine for retaining a plurality of flat articles therein,
feeding means adjacent to said magazine for removing said articles from said magazine and for positioning them in partial overlapping relationship with respect to each other so that said articles are substantially positioned in a horizontally disposed plane;
conveying means for moving said articles along a path,
taping means for transferring a continuous tape to said articles in the direction of said path,
positioning and securing means for pressing said tape onto said articles to form an integrated stream thereof, and
cutting means positioned in said apparatus to enter between overlapped portions of two adjacent articles for severing said tape to separate said articles from each other.

2. The invention of claim 1 wherein said magazine is positioned to maintain said articles at an angle of from 10° to 60° relative to a horizontally disposed plane containing said path.

3. The invention of claim 1 further comprising detent means in said magazine for engaging and releasably holding the articles in said magazine.

4. The invention of claim 1 wherein said feeding means comprises suction cup means normally positioned below said path and movably mounted in said apparatus for grasping an article to remove it from said magazine.

5. The invention of claim 4 wherein said feeding means further comprises shuttle means positioned adjacent to said suction cup means for moving an article to said conveying means in the direction of said path after it has been removed from said magazine.

6. The invention of claim 1 wherein said conveying means comprises opposed belts extending in the direction of said path and positioned on opposite sides thereof for positively gripping opposite sides of said articles.

7. The invention of claim 1 further comprising preheating means for heating surface areas of said blanks prior to when a heat sensitive tape is secured thereto by said taping means.

8. The invention of claim 1 wherein said taping means comprises a spool of tape rotatably mounted above said path and guide means positioned between said spool of tape and said path for guiding the tape downwardly towards said articles.

9. The invention of claim 8 wherein said positioning and sealing means comprises a roll rotatably mounted above said articles and cooperating with said guide means for positioning and pressing said tape onto said articles.

10. The invention of claim 9 further comprising heating means for heating said roll to further aid in securing said tape to said articles.

11. The invention of claim 9 wherein said positioning and sealing means further comprises a second roll rotatably mounted adjacent to said first mentioned roll for further pressing said tape onto said articles.

12. The invention of claim 11 further comprising heating means for heating said second roll to further aid in securing said tape to said articles.

13. An apparatus for forming taped articles comprising a magazine for retaining a plurality of articles therein,
feeding means adjacent to said magazine for removing said articles from said magazine and for positioning them in partial overlapping relationship with respect to each other;
conveying means for moving said articles along a path,
taping means for transferring a continuous tape to said articles in the direction of said path,
positioning and securing means for pressing said tape onto said articles to form an integrated stream thereof, and
cutting means comprising a disc rotatably mounted in said apparatus to rotate in a plane substantially coinciding with a horizontally disposed plane containing said articls for severing said tape to separate said articles from each other.

14. The invention of claim 13 wherein said disc comprises a cutting edge on the periphery thereof positioned to cut said tape to separate said articles from each other and to move between leading and trailing articles.

15. The invention of claim 14 wherein said disc further comprises a raised portion positioned on said disc to move over said trailing article to ready said cutting edge for the next cutting operation.

16. The invention of claim 13 further comprising spaced guide plates mounted in said apparatus adjacent to said disc to support and maintain said articles therebetween during movement of said articles past said disc.

17. In an apparatus for connecting and then separating two connected and overlapped flat articles comprising a magazine for retaining said articles, feeding means for removing said articles from said magazine, conveying means for moving said articles along a path and taping means for applying a tape to said articles, the invention comprising a substantially flat disc rotatably mounted in said apparatus, said disc comprising at least one cutting edge on the periphery thereof positioned to rotate between said articles to separate them from each other and at least one raised portion formed on said disc to rotate over one of said articles upon further rotation of said disc.

18. A method for applying a tape to a series of flat articles comprising the steps of
positioning a plurality of flat articles in partial overlapping relationship to expose a leading edge of each article and to cover a trailing edge thereof,
conveying said articles along a path,
securing a continuous tape to said articles in the direction of said path, and
cutting said tape substantially at the leading edge of each article by inserting cutting means between overlapped portions of said flat articles.

19. The invention of claim 18 wherein said positioning step comprises the steps of
maintaining a stacked, plurality of said articles vertically above said path, and
moving the lowermost article vertically downwardly into said path.

20. The invention of claim 19 wherein said positioning step further comprises the step of
moving the lowermost article horizontally in the direction of said path after said article has been dropped into said path.

21. The invention of claim 19 wherein said moving step comprises the step of
grasping and pulling said lowermost article vertically downwardly by a suction cup.

22. The invention of claim 18 wherein said conveying step comprises the step of
positively gripping opposite sides of said articles in the direction of said path at a position remote from whereat said tape is applied to said articles.

23. The invention of claim 18 wherein said securing step comprises the step of
bonding said tape to said article by the application of heat and pressure.

24. The invention of claim 23 wherein said bonding step comprises the steps of
preheating surface portions of said article whereat said tape is to be applied, and
pressing a heat sensitive tape onto said heated surface portions.

25. The invention of claim 18 wherein said securing step comprises the step of
feeding said tape tangentially onto said articles.

26. The invention of claim 18 wherein said cutting step comprises the step of
rotating a horizontally disposed cutting blade between a leading and a trailing article.

27. The invention of claim 26 wherein said rotating step further comprises the step of
rotating portions of said cutting blade on top of said trailing article after other portions of said cutting blade have been rotated between said leading and trailing articles.

References Cited

UNITED STATES PATENTS

| | | |
|---|---|---|
| 2,954,225 | 9/1960 | Novick. |
| 3,259,031 | 7/1966 | Paulson _____ 93—61 |
| 3,355,995 | 12/1967 | Borkmann et al. _____ 93—1 |
| 3,439,588 | 4/1969 | Taylor et al. _____ 93—36.9 |

THERON E. CONDON, Primary Examiner

H. A. KILBY, Jr., Assistant Examiner

U.S. Cl. X.R.

83—355